United States Patent [19]

Horne

[11] Patent Number: 5,473,379
[45] Date of Patent: Dec. 5, 1995

[54] METHOD AND APPARATUS FOR IMPROVING MOTION COMPENSATION IN DIGITAL VIDEO CODING

[75] Inventor: Caspar Horne, Beaverton, Oreg.

[73] Assignee: AT&T Corp., Murray Hill, N.J.

[21] Appl. No.: 147,802

[22] Filed: Nov. 4, 1993

[51] Int. Cl.$^6$ ..................................................... H04N 7/32
[52] U.S. Cl. .......................... 348/416; 348/402; 348/413; 348/699
[58] Field of Search ..................................... 348/699, 420, 348/416, 413, 402; H04N 7/137

[56] References Cited

U.S. PATENT DOCUMENTS

| | | | |
|---|---|---|---|
| 5,006,929 | 4/1991 | Barbero | 348/420 |
| 5,151,784 | 9/1992 | Lavagetto et al. | |
| 5,247,355 | 9/1993 | Frederiksen | 348/416 |

OTHER PUBLICATIONS

M. Bierling, "Displacement Estimation By Hierarchical Blockmatching," Visual Communications and Image Processing '88, Proceedings of the International Society for Optical Engineering, vol. 1001, Part 2 of 2, pp. 942–951, Nov. 9–11, 1988.

Jaswant R. Jain and Anil K. Jain, "Displacement Measurement And Its Application In Interframe Image Coding," IEEE Transactions on Communications, vol. COM-29, No. 12, pp. 1799–1808, Dec. 1981.

R. Srinivasan and K. R. Rao, "Predictive Coding Based On Efficient Motion Estimation," Links For The Future: Science, Systems and Services for Communications, Proceedings of the International Conference on Communications—ICC [84, pp. 521–526, May 14–17, 1984.

Q. Wang and R. J. Clarke, "Motion Estimation And Compensation For Image Sequence Coding," Image Communication, vol. 4, No. 2, pp. 161–174, Apr. 1992.

*Primary Examiner*—Howard W. Britton

[57] ABSTRACT

A novel method and apparatus for use in digital video compression provides improved block-based motion compensation using the global motion of a video frame. A video frame comprising a plurality of blocks may be compressed for transmission using block motion vectors. Motion vectors are generated by block matching a block to be coded with a block within a reference frame and determining the displacement therebetween. To effect block matching, motion compensation techniques define a search window within one or more reference frames within which a displaced block will be found. According to the present invention, the location of the search window within a reference frame is defined using the global motion of the frame.

21 Claims, 5 Drawing Sheets

METHOD AND APPARATUS FOR IMPROVING MOTION COMPENSATION IN DIGITAL VIDEO CODING

FIELD OF THE INVENTION

The present invention relates to the field of digital video data compression, and in particular video data compression using block-based motion compensation.

BACKGROUND OF THE INVENTION

Block-based motion compensation techniques including either motion interpolation or motion prediction are used in digital image sequence coding to reduce the amount of data that must be transmitted in digital video systems. Video sequences typically exhibit a substantial amount of repetitive image information between consecutive frames. By compensating for the motion of objects within an image frame, a high compression of the video data can be achieved.

Block-based motion compensation techniques initially divide a video frame into several blocks of picture elements (pels). These techniques employ motion vectors to indicate the movement of these blocks between successive frames. It is assumed that each pel within a block has the same translational motion. These motion vectors, along with error signals, may be transmitted to a receiver. The receiver may then regenerate the video blocks using the motion vectors to locate the corresponding blocks from a previously transmitted frame. The error signals are used to account for pel differences within each block between successive frames.

Consider, for example, the image of a football in a football game video sequence. The football image remains substantially identical from frame to frame, but its location within the video frame changes. If the motion vector of the football is known, then the image of the football can be reconstructed in a new video frame using the football image data from the previous frame. As a consequence, instead of transmitting repetitive image data for each new frame, motion vectors may be transmitted. An error signal is also transmitted to account for other differences, for example, a change in orientation of the football.

Motion compensation methods employ a process known as motion estimation to generate the motion vectors. In motion estimation, a motion vector for a particular block within a current frame is determined by matching the image data within the block to the image data in a displaced block within a reference frame. The motion vector represents the difference in position between the block from the current frame and the displaced block from the reference frame. The reference frame may be a previous frame, as in motion compensation prediction techniques, or a previous or future frame, as in motion compensation interpolation techniques.

To effect such block matching, the entire reference frame is not ordinarily searched for the displaced block, as such a search can consume considerable computation power and time. Instead, a search window is defined within the reference frame.

In motion estimation, a search window may be defined in terms of its size in pels and its location within the reference frame. In determining search window location, it is known in the art to center the search window on the position of the block to be matched. The method assumes that an image within a video block is most likely to be found in the vicinity of its location in a previous or subsequent frame. The search window size is then optimally chosen to be as large as the sum of the block size and the maximum probable block movement in any direction. For example, for a 15×15 pel block capable of moving up to 5 pels in any direction between frames, the maximum search window size would be 25×25 pels.

Referring again to the analogy of a football within a football game video sequence, the football may, for discussion purposes, represent a block of video data. To find a displaced football in a reference frame, a motion estimation method would initially define a search window within which it would expect to find the football image in the reference frame. The search window is then scanned for the image within the window most resembling the football. Once the football image is found, a motion vector may be calculated for the football describing its movement between the reference frame and the present frame.

Under such methods of locating the search window, however, the search window size used for block matching limits the range of motion that may be compensated for. In the 25×25 pel search window defined above, block motion of more than 6 pels cannot be successfully compensated. If the motion estimation method fails to find the proper displaced block, a large error signal will have to be transmitted, and the advantages of motion compensation will be greatly reduced.

To increase the range of motion which may be compensated for, it is well known that the search window size may be enlarged in order to account for greater image movement. The use of larger search windows, however, consumes more computation time and power because there are more candidate displaced blocks to evaluate to effect block matching. For example, if an exhaustive search is used to effect block matching, an increase in size of a 25×25 search window by a single pel in each direction will increase the number of candidate displaced blocks by $27^2-25^2=104$ blocks.

Several attempts have been made to increase the range of motion which may be compensated for without drastically increasing the computational load. It is well known in the art to employ search algorithms which are faster than an exhaustive search. These algorithms include the hierarchical search, the logarithmic search, and conjugate direction search. Because motion estimation techniques using such algorithms greatly reduce the number of calculations required for block matching, they may employ larger search windows than an exhaustive search routine.

The faster search techniques, however, are not guaranteed to find the proper displaced block. In other words, these algorithms may not find the best match for a particular block to be coded, which leads to coding inefficiency. Furthermore, such search techniques require complex image data manipulation when compared with the exhaustive search. The complex image data manipulation may also computationally load the system.

SUMMARY OF THE INVENTION

The present invention provides a method of motion estimation operable to enable compensation for a large range of motion using a novel method of locating the search window. Large amounts of motion in video are often due to a combination of object motion and global motion caused by, for example, camera motion. According to the present invention, the search window is placed in a location that takes into account the global motion of the entire video frame, thus enabling compensation for greater amounts of motion when a component of the motion is caused by global motion.

For example, again consider the image of a moving football in a football game video sequence. The motion of the football is often due to camera motion as well as object motion, which in the process of block matching may cause the football image to fall outside a reasonably sized search window. If, however, the search window is placed in a location in a reference frame that takes into account the camera motion, then the search window would more likely contain the football image, thus facilitating successful compensation.

Accordingly, the method of the present invention generates a global motion vector from time to time and transmits this data to a motion estimation device. To perform block matching, the motion estimation device uses the global motion vector to define a search window in which a displaced block may be found within one or more reference frames. The motion estimation device then identifies the displaced block within the defined search window. The method of the present invention is compatible with both motion compensation prediction and motion compensation interpolation techniques.

The present invention may be utilized with either an exhaustive search in block matching, or it may also be used with faster search techniques.

DETAILED DESCRIPTION

The present invention provides an improvement to current motion estimation techniques used in block-based motion compensation by using the global motion, caused by, for example, camera motion, to assist in defining a search window in the process of block matching. A novel video coder circuit 100 employing motion estimation techniques according to the present invention is described below in connection with FIG. 1.

Figure 1:
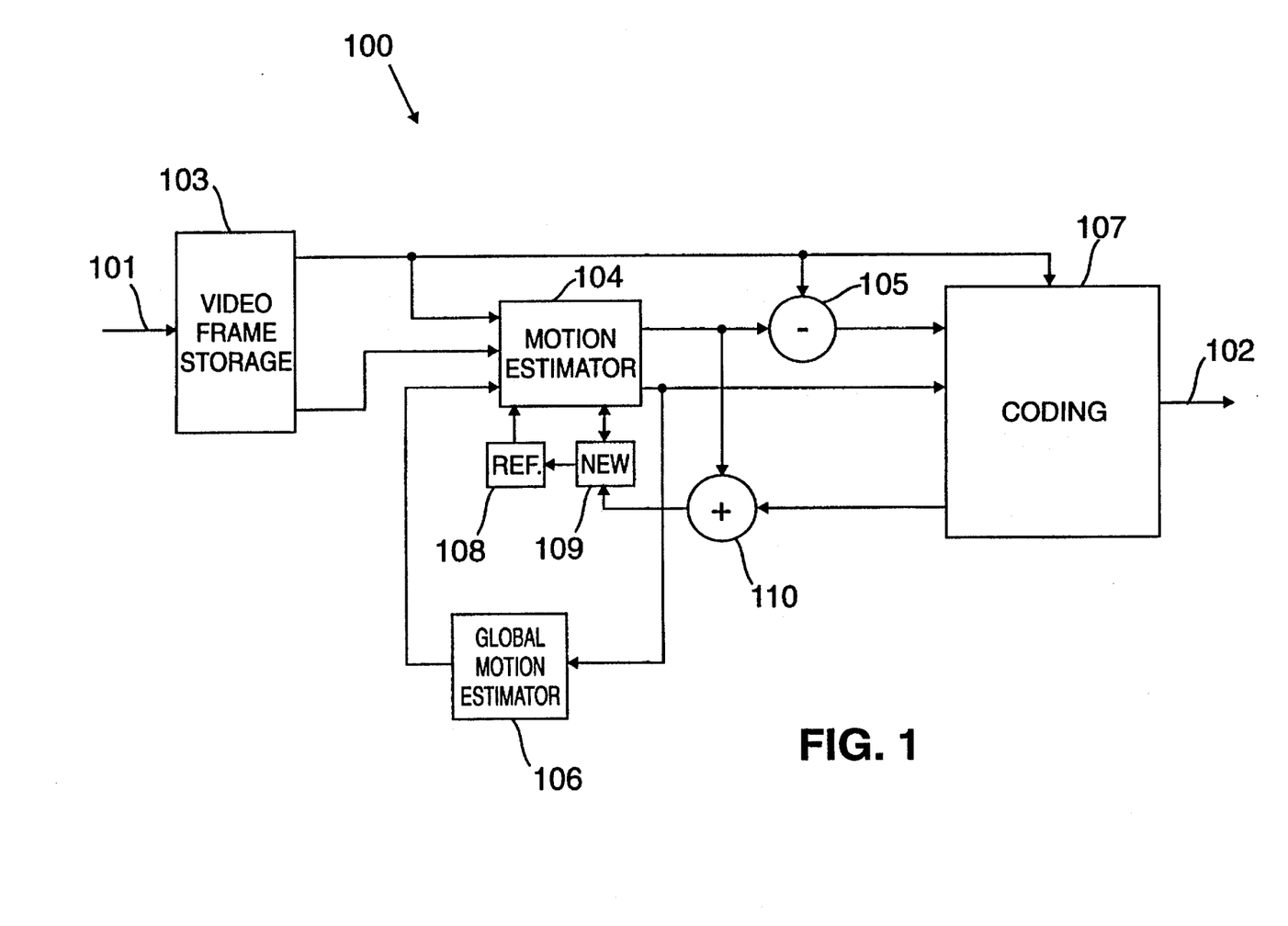
FIG. 1 shows a block diagram of a video coder circuit employing a novel block-based motion compensation method and apparatus according to one embodiment of the present invention.

FIG. 1 shows, in block diagram form, video coder circuit 100 for encoding a sequence of image frames represented in digital form using block-based motion compensation. The block diagram is shown in simplified form for purposes of clarity. To this end, various aspects of digital circuitry are not represented in the diagram and should be considered as inherent to the system. For example, a timing and sequence controller for the various functional blocks, as well as imbedded storage elements such as buffers and memories are not shown. The details pertaining to the use of such digital circuitry in a system according to the present invention are well known or will be readily apparent to one of ordinary skill in the art.

The video coder circuit 100 receives at its input 101 video data corresponding to temporal frames of video. A frame of video comprises a plurality of picture elements or pels. The digital representation of the video frame as it appears at the input 101 of video coder circuit 100 comprises pel video data for each pel within the frame. The pel video data typically comprises chrominance and luminance values. A video frame may be further subdivided into blocks of pels, and frames are processed by the video coder circuit 100 on a block by block basis.

The video coder circuit 100 produces at its output 102 a compressed and encoded digital signal in a bit stream for subsequent storage or transmission over a transmission medium, not shown. The compressed and encoded digital signal may be suitably coded according to the MPEG1, MPEG2 or any other video data transmission standard that is designed specifically to work with data compression techniques including block-based motion compensation prediction and interpolation. See, for example, ANSI Standard ISO-IEC DIS 11172, "Coding of Moving Pictures and Associated Audio for Digital Storage Media For Up to About 1.5 Mbit/sec."

The video coder circuit 100 illustrated in FIG. 1 compresses and encodes data employing motion compensation prediction techniques. In processing the blocks of a video frame, the circuit 100 may either encode a particular video data block directly or encode the block using motion compensation prediction. Video blocks that cannot be successfully compensated are encoded directly.

The functional elements in the video coder circuit 100 are interconnected as follows. A video frame storage unit 103 is operably connected to transfer both video data and position data corresponding to a new block of video to be coded ("new block") to a motion estimator 104, and to transfer the same new block video data to both a subtraction node 105 and a coding device 107. The video frame storage unit 103 includes a digital memory or buffer which stores both video data corresponding to one or more frames and is operable to generate and store block position data for the video blocks within each stored frame.

The motion estimator 104 is operably connected to receive block video data from the video frame storage unit 103 and global motion data from a global motion estimator 106. The motion estimator 104 comprises a processing means such as a microprocessor and related memory circuitry which is operable both to effect block matching using global motion data and to generate motion vectors. The motion estimator 104 further includes motion compensation means for providing displaced block data to the subtraction node 105. According to one embodiment of the invention, the processing means within the motion estimator 104 is programmed to execute the block matching and motion vector generation consistent with the flow chart 300 described below in connection with FIG. 3A. The motion estimator 104 is further connected to transfer block video data to the subtraction node 105 and to provide motion vector data to both a coding device 107 and the global motion estimator 106.

The motion estimator 104 is further connected to a reference frame storage buffer 108 and a new frame storage buffer 109. The new frame storage buffer 109 is connected between an addition node 110 and the reference frame storage buffer 108. Both the new frame storage buffer 109 and the reference frame storage buffer 108 have sufficient storage space to hold the video data corresponding to at least one video frame.

The subtraction node 105 is operably connected to receive new block video data from the video frame storage unit 103 and to receive displaced block video data from the motion estimator 104. The subtraction node 105 is further connected to the coding device 107. The subtraction node 105 comprises a data storage means, such as a buffer and means for generating an error signal representing the difference in pel luminance and chrominance between two video data blocks received from the motion estimator 104 and the video frame storage unit 103.

The coding device 107 is operably connected to receive the error signal from the subtraction node 105, motion vector data from the motion estimator 104 and block video data from the video frame storage unit 103. The coding device 107 is further connected to provide an error signal to the addition node 110, and includes the output 102 for transmitting coded video data in the form of a bit stream. The coding device 107 comprises a means for encoding and decoding video data using the MPEG1, MPEG2 or other coding standard for transmitting a coded bit stream. Devices capable of coding in these standards are known in the art. For more information on such coding methods and devices, see ANSI Standard ISO-IEC, above, incorporated by reference herein.

The global motion estimator 106 is connected to receive motion vectors from the motion estimator 104 and to provide the global motion vector to motion estimator 104. The global motion estimator comprises the processing means and related circuitry operable to store a plurality of motion vectors and to compute therefrom a global motion vector that is representative of a common motion component within an entire video frame. Although the global motion estimator 106 is illustrated as a separate element, the functions performed by the global motion estimator processing means may be performed by either a dedicated microprocessor or a microprocessor included within the system to perform other control and operational functions. To achieve its desired functions, the global motion estimator 106 may suitably be programmed consistently with the flow chart 400 discussed below in connection with FIG. 4.

The addition node 110 is connected to receive block video data from the motion estimator 104 and error signal from the coding device 107. The addition node 110 comprises means for combining a block of video data with an error signal to produce a compensated block of video data. The addition node provides the compensated block to new frame memory buffer 109.

The video coder circuit 100 described above operates in the following manner to process and encode a new video frame, one block at a time, using block-based motion compensation with global motion estimation. A video frame to be coded is first divided into blocks. Each block is then encoded either directly or using motion compensation prediction until the entire frame is encoded. The decision of whether or not to encode using motion compensation is made by the control circuitry using predetermined criteria, typically dependent on the size of the error signal produced during motion compensation. The next frame is thereafter processed in the same manner.

It should be noted that the various elements discussed below exchange data using digital signals, the generation of which is known to those of ordinary skill. For purposes of clarity, it will be understood that when any element is said to provide or receive data, for example, representing video blocks or motion vectors, to or from another element, the element is actually providing or receiving digital signals containing the data.

In order to process a video frame one block at a time, the control circuitry directs that each frame, prior to processing, be divided into blocks of video data, $DB_{i,t}$, where i is the block number within a frame corresponding to a time t. Initially, video data defining a video frame $F_t$ corresponding to a time t in a video sequence is stored in a buffer or other storage means within the video frame storage unit 103. The time t actually represents a sequential frame number such that, for example, $F_{t-1}$ is the frame immediately preceding $F_t$, and $F_{t+1}$ is the frame immediately subsequent to $F_t$. The control circuitry directs that each frame be divided into a number of blocks per row m, and a number of blocks per column n, so that the frame has total number of blocks, NB, or in other words, m×n=NB blocks. The control circuitry may be user controllable to select the number of blocks per row m and the number of blocks per column n. Once the number of blocks is determined, the video frame storage unit 103 then obtains and stores block position values $BP_{i,t}$ for each block within one video frame.

For the present embodiment of the invention, the block position value may suitably be defined as the pel position value of the pel in the upper left hand corner of each block. The pel position value constitutes the position within the two-dimensional array of pels comprising the video frame. The pel position may suitably be provided by the control circuitry. The video frame storage unit 103 may determine the block position for each block i, $BP_{i,t}=(x,y)$, using any appropriate method.

Figure 2A:
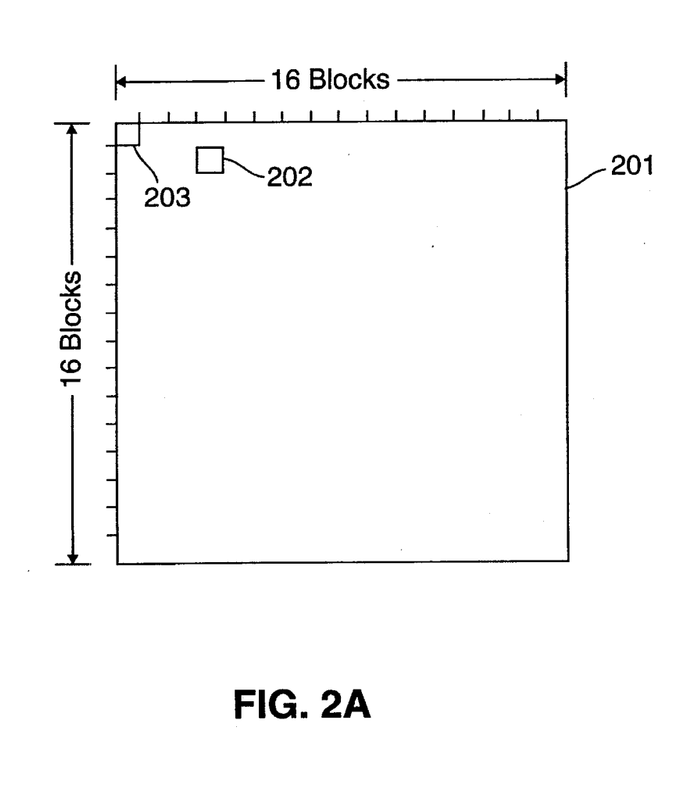
FIGS. 2A and 2B show a video image frame divided into blocks of pels in accordance with standard methods of video data coding techniques.
Figure 2B:
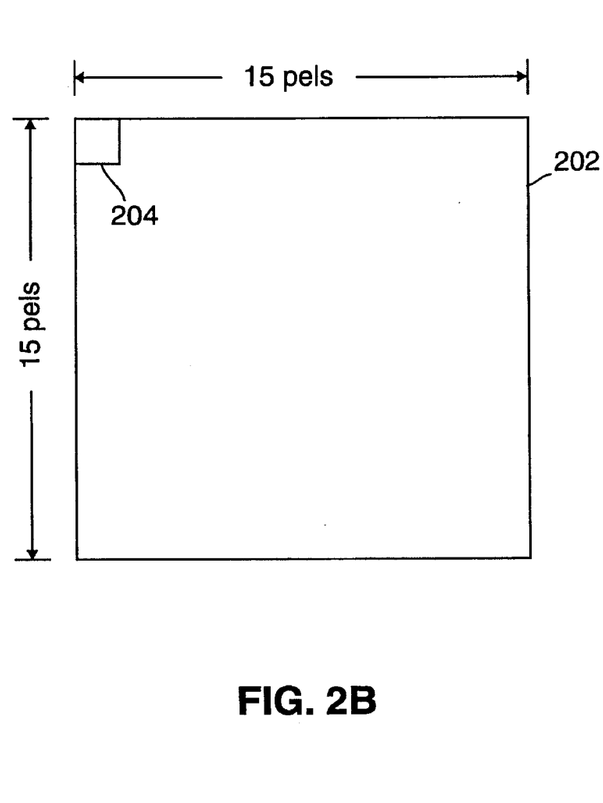

For example, FIG. 2A illustrates the frame $F_t$ 201, which is divided into 16 rows and 16 columns of blocks. Block 202 represents data block $DB_{19,t}$ in frame 201 wherein the first block 203 is $DB_{0,t}$ and the block i-values are counted from left to right and top to bottom. Block 202, as shown in FIG. 2B comprises a 15×15 array of pels, one of which is exemplified by upper left corner pel 204. The pel position value for pel 204 is (45,15), corresponding to its x,y coordinates. These coordinates are determined as follows. Pel 204 is the upper left hand pel of block 202. Block 202 is the 19th block in frame $F_t$ 201, and it is in the fourth column and second row of frame $F_t$ 201. X-pels 0–14 are in blocks in the same column as block 203, x-pels 15–29 are in blocks in the second column, x-pels 30–44 are in blocks in the third column, and x-pels 45–59 are in blocks in the fourth column, which is the column block 202 is in. Thus, the left most pels of block 202 will have an x-coordinate of 45. Likewise, y-pels 0–14 are in blocks in the same column of block 203, and y-pels 15–29 are in blocks in the next column, which is the column block 202 is in. Thus, the upper most pels of block 202 will have a y-coordinate of 15. The block position value of block 202, as discussed above, is the pel position value for its upper left hand corner pel 204. Therefore, $BP_{19,t}=(45,15)$.

Once the data blocks and their respective block position values are defined, the control circuitry directs that each block $DB_{i,t}$ be processed, block by block. Returning to FIG. 1, the control circuitry instructs the video frame storage unit 103 to provide a new block of video data, $DB_{i,t}$ and the corresponding block position data, $BP_{i,t}$ to the motion estimator 104. The new block video data $DBi_{i,t}$ is further transmitted to the subtraction node 105 and stored in a buffer therein.

The motion estimator 104 then effects block matching in order to match $DB_{i,t}$ with a data block, $MB_{ref}$, from the video frame stored in the reference frame storage buffer 108. The storage buffer 108 contains at least one reference video frame. Because the block is to be encoded using motion compensation prediction in the present embodiment, the reference frame comprises the previous video frame, $F_{t-1}$. In motion compensation prediction, the location of the displaced block represents the location of the video image defined by the new block within the previous frame.

If, however, the new block is to be encoded using motion compensation interpolation techniques, the motion estimator 104 locates $MB_{ref}$ within a plurality of reference frames stored in the reference frame storage buffer 109. The plurality of reference frames may correspond to both previous and/or future video frames depending on the chosen motion compensation technique. In such cases, the motion estimator 104 performs the block matching step for the plurality of reference frames.

The motion estimator 104 is operable to effect block matching for each reference frame in the following manner. The motion estimator 104 first defines a search window within the reference frame in which the displaced block may be expected to be found. According to the present invention, the motion estimator 104 uses a global motion vector in defining the location of the search window. The global motion vector is representative of motion common to all the blocks within the video frame $F_t$, and is from time to time provided by the global motion estimator 106 as discussed in detail further below. The defined search window is thereafter searched until the displaced block $MB_{ref}$ for the new block $DB_{i,t}$ is found.

Once a displaced block $MB_{ref}$ is found, the motion estimator 104 determines the motion vector $MV_{i,dt}$ corresponding to the new block. The value dt indicates the frame number difference between $F_t$ and the reference frame. For motion prediction, the reference frame will typically be the previous frame, and therefore dt=1. The motion vector $MV_{i,dt}$ comprises a two-dimensional value (dx,dy) representing the horizontal and vertical displacement between the new block $DB_{i,t}$ and the displaced block $MB_{ref}$. The two-dimensional motion vector value (dx,dy) may suitably be determined by calculating the difference between the new block position value $BP_{i,t}$ and the pel position value of the pel in the upper left corner of the displaced block $MB_{ref}$. For example, referring to FIG. 2, the block 202 ($DB_{19,t}$) has a block position value $BP_{19,t}=(45,15)$. If it is further assumed that a displaced block has been identified as corresponding to block 202 and that the pel position value of the upper left hand corner pel of the displaced block $MB_{ref}$ is (50,21), then the motion vector $MV_{19,dt}=(dx,dy)=(+5,+6)$.

A functional block diagram of an exemplary block matching and motion vector generating method which may be employed by the motion estimator 104 to achieve the foregoing is discussed further below in connection with FIG. 3A.

The displaced block video data $MB_{ref}$ in the motion compensator 104 is then transmitted to the subtraction node 105. The displaced block video data is also transmitted to the addition node 110 for purposes discussed further below. In the subtraction node 105, the displaced block video data $MB_{ref}$, comprising both luminance and chrominance data, is subtracted on a pel by pel basis from the new block video data $DB_{i,t}$ received and stored from the video frame storage unit 103. The resulting error signal ERROR represents the difference between the displaced block $MB_{ref}$ and the new block $DB_{i,t}$. The signal ERROR is then provided to the coding device 107.

The motion estimator 104 provides the motion vector $MV_{i,dt}$ to the coding device 107. The motion vector is also provided to the global motion estimator 106 for purposes discussed further below. The coding device 107 comprises digital circuitry, which may include a microprocessor, that is capable of producing digital signals according to the MPEG1, MPEG2 or other standard to the video coder output 102.

The coding device 107 also receives the new block video data $DB_{i,t}$ from the video frame storage buffer 103. The control circuitry then determines whether the motion compensated version of the block, in other words, the motion vector and the signal ERROR, should be encoded and transmitted. If not, the control circuitry instructs the coding device 107 to encode the new block video data $DB_{i,t}$. If, however, the motion compensated block is to be transmitted, the control circuitry instructs the coding device 107 to encode for transmission the motion vector $MV_{i,dt}$ and the signal ERROR. The encoded data is then provided to the circuit output 102 for transmission to one or more receiving devices, not shown. In either case, the encoded data is transmitted in a bit stream along with appropriate signals to indicate whether the motion compensated version of the block has been transmitted.

After transmission, the new block $DB_{i,t}$ is stored in order to build the current frame in new frame storage buffer 109. If the motion compensated version of the block was transmitted, the addition node 110 will receive a decoded version of the coded error signal from the coding device 107 and will add the error signal to $MB_{ref}$ which is received from the motion estimator 104. The resulting block, called a compensation block, closely resembles the new block $DB_{i,t}$. The compensation block is placed inside the new frame buffer 109 in a position corresponding to the new block position value, $BP_{i,t}$.

If, however, the motion compensated version of the block was not transmitted, the new block video data $DB_{i,t}$ may be placed directly into the new frame buffer 109 from the motion estimator 104. In this manner, the frame $F_t$ is built within the new frame storage buffer 109 which will eventually be placed in the reference frame storage buffer 108.

Concurrent with the operation of the coding device 107 and the addition node 110, the global motion estimator 106 receives the motion vector $MV_{i,dt}$. The motion vector $MV_{i,dt}$ at is received into a buffer, stack or memory within the global motion estimator 106.

The process performed by video coder circuit 100, as outlined above, is repeated for each block $DB_{i,t}$ of each frame until an entire video frame (i=NB) has been encoded by the video coder circuit 100. Once the entire frame $F_t$ has been processed, the control circuitry will cause the new frame buffer 109 to transfer the video data corresponding to the frame $F_t$ to the reference frame storage buffer 108 in order to process the next frame corresponding to the time t+1.

Furthermore, before the next frame is processed, the global motion estimator 106 will generate and transmit a new global motion vector to the motion estimator 104. The global motion estimator 106 generates the global motion vector using the motion vectors stored during the processing of $F_t$. The global motion vector approximates the component of motion common to every block in a frame of a video sequence which may be due to camera motion. The motion estimator 104 receives and stores the global motion vector GMV prior to receiving the new video data block for the first block of the next frame ($DB_{0,t+1}$). The global motion estimator may be programmed to execute the above functions as discussed below in connection with FIG. 4

It will be understood that the video coder circuit 100 described in connection with FIG. 1 is exemplary. The global motion estimation method and apparatus of the present invention may be utilized in any block-based video motion compensation device that performs block matching to compute motion vectors between a block to be coded and a displaced block within one or more reference frames, by first defining a search window in the reference frames. For example, U.S. Pat. No. 5,151,784 incorporated herein by reference illustrates a video coder circuit incorporating such a motion compensation device that is operable to employ both motion compensation prediction and motion compensation interpolation for coding block based video data. The method according to the present invention may readily be adapted for use therein.

Figure 3A:
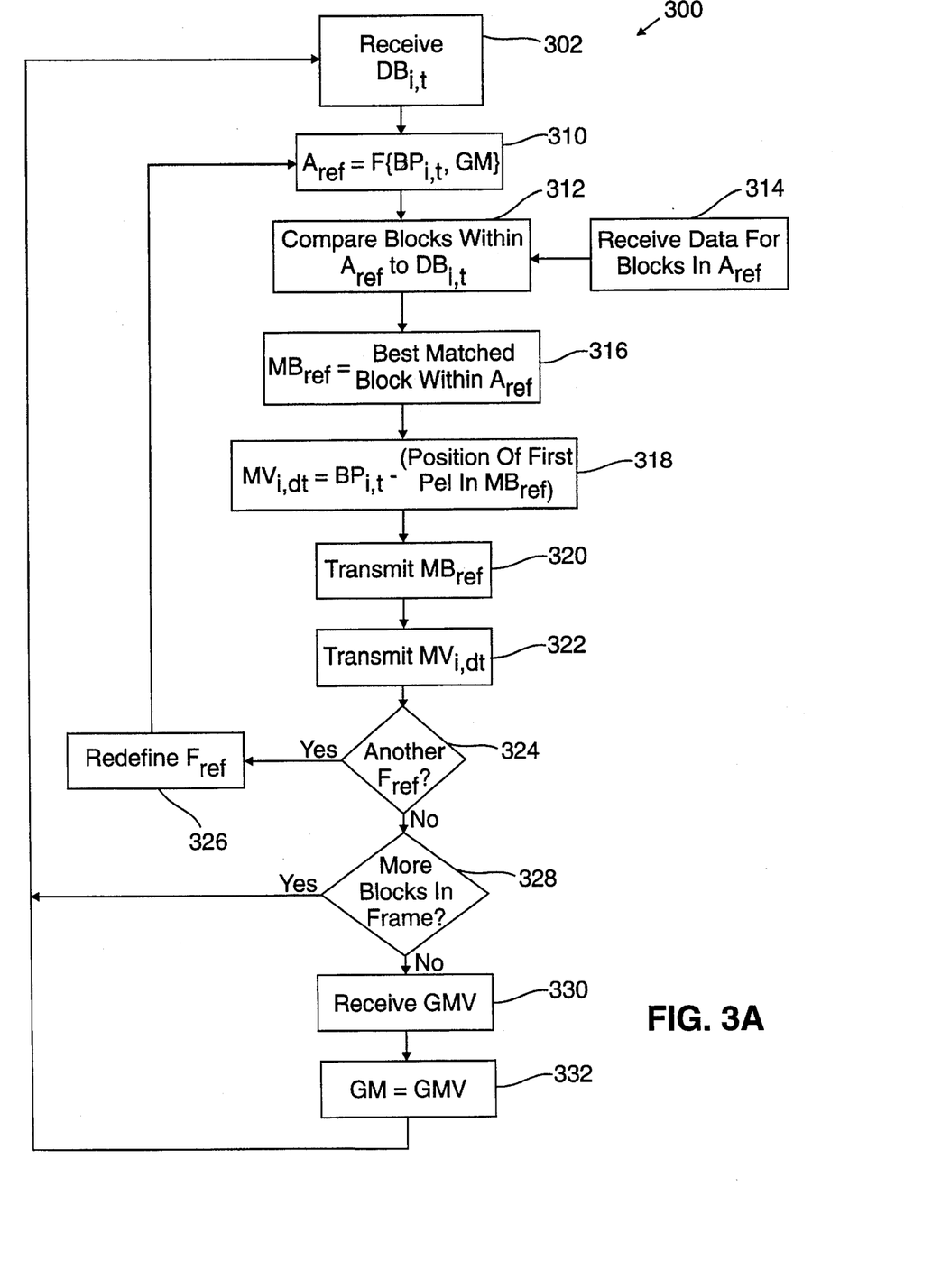
FIG. 3A shows a functional flow diagram of the steps performed by a motion estimation device according to the present invention.

FIG. 3A illustrates a functional flow chart for a motion compensation device that employs a global motion vector to effect block matching according to the present invention. The flow chart may suitably be executed by the motion estimator 104 in FIG. 1. The functionality of the flow chart, however, is designed to be compatible with alternative video coder circuits employing both motion compensation prediction and motion compensation interpolation. The processing means and memory means (processor) within the motion estimator execute a program performing the steps in FIG. 3A to effect block matching and motion vector generation.

The processor first receives new block video data $DB_{i,t}$ for a block i within a frame $F_t$ in step 302. Next, in step 310, the search window $A_{ref}$ within the reference frame is defined. $A_{ref}$ is video data representing the portion of the reference frame within which a displaced block $MB_{ref}$ for $DB_{i,t}$ may be located. The location of $A_{ref}$ within a the reference frame is defined by first centering $A_{ref}$ on the new block position BPi,t, and then displacing $A_{ref}$ by an amount defined by the stored global motion vector GM.

It should be noted that the global motion vector GM is normalized to represent the global motion between the current frame and the immediately preceding frame, $F_{t-1}$. As a consequence, if the reference frame is not the immediately preceding frame, the global vector should be scaled accordingly. Scaling may suitably be linear. For example, if the reference frame corresponds to a time t−2, then the global motion vector should be doubled before determining the location of $A_{ref}$. Likewise, in motion compensation interpolation, the reference frame may be a future frame, in which case the global motion vector should be inverted. By storing and subsequently scaling a normalized global motion vector, the processor may suitably apply the global motion vector to block matching operations in both interpolated and predicted modes.

The size of the search window $A_{ref}$ should preferably be large enough to ensure inclusion of the displaced block, but small enough so that the block matching function does not unduly load the processing means of the motion estimator. The size of search window $A_{ref}$ is a predetermined number which takes into account the maximum object motion between video frames and may vary depending upon the application, as well as other factors. In the context of a particular application, the determination of a proper size will be apparent to one skilled in the art.

Figure 3B:
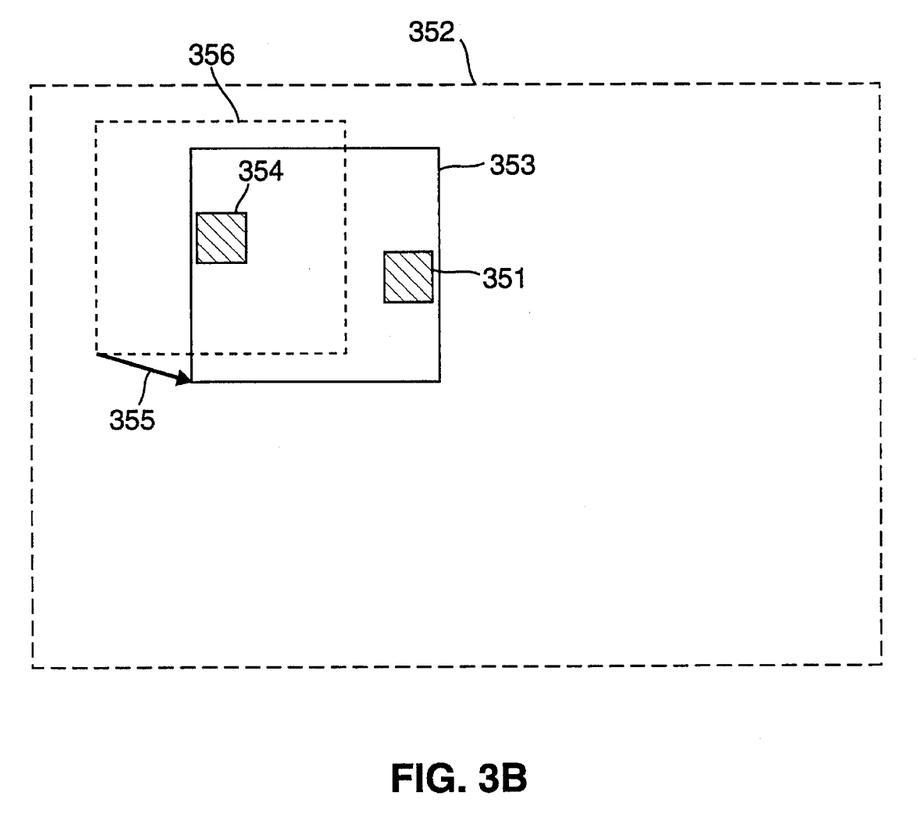
FIG. 3B illustrates how a global motion vector may be utilized in accordance with the present invention to define a search window within a reference frame to more effectively achieve block matching according to the present invention.

FIG. 3B further illustrates the novel method of defining the search window $A_{ref}$ as described in connection with step 310. In FIG. 3B, the given block 354 from the frame $F_t$, effects block matching to identify displaced block 351 from the reference frame, which may suitably be the previous frame.

The image in a data block $DB_{i,t}$ is assumed to have moved from the position of block 351 in the reference frame to the position of $DB_{i,t}$ shown by the block 354. The movement of the image in $DB_{i,t}$ is due in substantial part to camera movement or some other source of global motion. The reference frame 352 has the same dimensions as the video frame to be coded from which $DB_{i,t}$ originated.

The search window $A_{ref}$ is located by first centering the search window on the position of the block position for the block 354, as illustrated by centered window 356. The search window is then displaced by the global motion vector 355, as illustrated by displaced window 353. The global motion vector 355 is representative of the component of motion, which may be caused, for example, by camera movement, that is common to all blocks within a frame. The global motion vector 355 may suitably be provided from time to time by the methods described below in connection with FIG. 4.

The use of global motion in defining the search window location provides a clear improvement over the prior art. Referring to FIG. 3B, the prior art method for locating the search window consists essentially of centering the search window around the position of the new block 354, as illustrated by centered window 356. See, for example, Jain, et al, "Displacement Measurement and its Application in Interframe Image Coding," 29 IEEE Transactions on Communications pp 1799–1808 (1981) incorporated herein by reference. It can be seen that the centered search window 356 does not include the displaced block 351. If the displaced block is not found, the motion estimator cannot effectively aid video compression.

The centered search window 356 could, of course, be enlarged to encompass displaced block 351. As discussed above, however, enlarging the search window can greatly increase the number of calculations required for block matching. Furthermore, because many video sequences have little or no camera motion, it would be wasteful to enlarge the search window when a smaller search window is adequate in still sequences. By using global motion, the search window can remain a reasonable size yet still encompass the displaced block in large camera movement sequences. Consequently, because the use of global motion allows for a larger range of motion when camera or global motion is present, it provides a substantial improvement to motion compensation techniques.

Returning to FIG. 3A, once the size and location of the search window $A_{ref}$ is chosen, the motion estimator identifies a displaced block $MB_{ref}$ within the search window using predetermined criteria in steps 312, 314 and 316. The identification of a displaced block within a reference frame is well known in the art. See, for example, Jain, et al, above, at 1799–1808. The displaced block is a block of data within the search window having the least image difference when compared to the $DB_{i,t}$. In step 312, the block $DB_{i,t}$ is compared with several candidate displaced blocks in the search window in order to determine the candidate block having the least image difference. In step 314, the data for the candidate blocks is retrieved as needed from a means for storing the reference frame, for example, the reference frame storage buffer 108 of FIG. 1. The image difference may suitably constitute the mean-absolute-difference or the mean-squared-error between the total pel luminance value for the new block $DB_{i,t}$ and the total pel luminance value for each candidate displaced block. For more information on such block matching techniques, see, for example, Jain, et al, above, at 1800; Srinivasan, et al, "Predictive Coding Based on Efficient Motion Estimation," Proc. Int'l Conf Communications pp. 521–26 (Amsterdam, May 14–17, 1984).

The choice of candidate blocks within the search window for which such image comparisons are made in step 312 is dictated by a predetermined search methodology. The search methodology may suitably be an exhaustive search, which compares every definable block within the search window with the new block. The exhaustive search is often preferable because it is guaranteed to find the block in the search area having the minimum error. The search methodology may alternatively be a logarithmic search, a hierarchical search or other search method which is known in the art. For more information on these alternative search methodologies, see, for example, Jain, et al, above; Srinivasan, et al, above; and Bierling, "Displacement Estimation by Hierarchical Blockmatching," Proc. Visual Communications & Image Processing '88, (SPIE, Nov. 9–11, 1988).

Once the displaced block $MB_{ref}$ is identified, the motion estimator 104 derives the motion vector $MV_{i,dt}$ for the new block $DB_{i,t}$ in step 318. The motion vector is defined as the displacement between the new block position $BP_{i,t}$ and the pel position of the upper left hand corner pel, or the first pel, of the displaced block, MBref. The displaced block is thereafter provided in step 320 to other elements in the coding circuit, for example, the subtraction node 105 and addition node 110 as illustrated in FIG. 1 above. In step 322, the motion vector $MV_{i,dt}$ is provided to the global motion estimator and other elements in the coding circuit, for example, the coding device from FIG. 1.

While motion compensation prediction employs only one reference frame, motion compensation interpolation performs block matching using more than one reference frame. As a consequence, in step 324, the processor must determine if there is another reference frame with which to perform block matching. If in step 324 the processor determines that another block matching step must be performed, the processor executes step 326. In step 326, the processor instructs the reference frame storage means to make the next reference frame available for block matching. The processor then returns to step 310 to define a search window within the new reference frame. If, however, the answer to step 324 is no, the processor executes step 328.

In step 328, the processor determines whether there are more new data blocks within the current frame to be compensated. This information may suitably be provided by the control circuitry. If no, the processor retrieves a new global motion vector GMV from the global motion estimator in step 330. The global motion estimator may suitably operate according to the method discussed below in connection with FIG. 4. In step 332, the new global motion vector is stored as GM for use within the motion estimator 104 for processing the next video frame, which in motion compensation prediction would typically be $F_{t+1}$. The motion estimator 104 thereafter executes step 302. If, however, the answer in step 328 is yes, the motion estimator 104 proceeds directly to step 302 to receive further blocks from the current frame.

Figure 4:
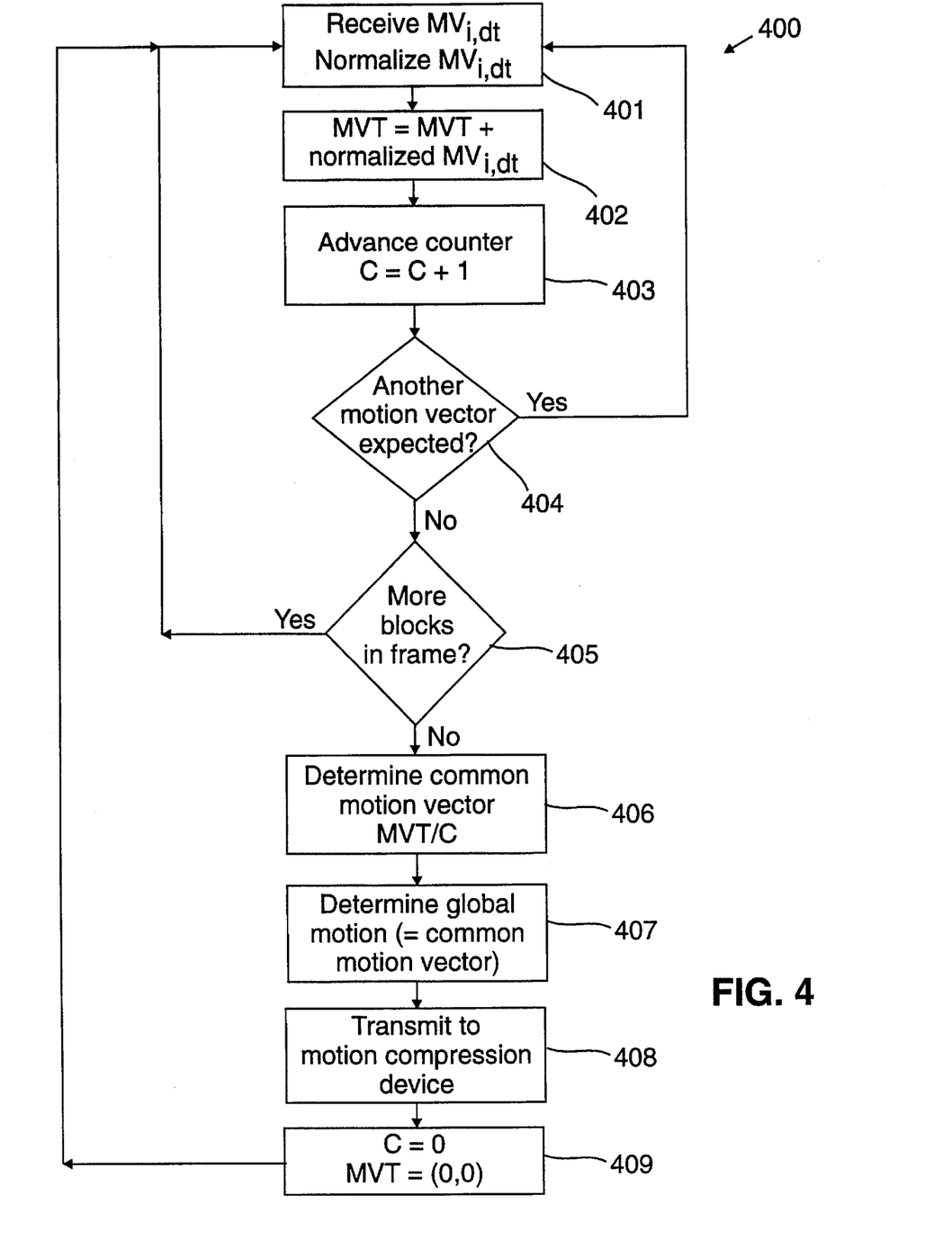
FIG. 4 shows a functional block diagram of a global motion estimator operable to generate global motion vector data for use in the methods and apparatus of the present invention.

FIG. 4 shows an exemplary functional flow diagram of the novel global motion estimation program according to the present invention. The program is executed by processing means within a global motion estimator such as the global motion estimator 106 that is discussed above in connection with FIG. 1. The global motion estimator may suitably be a digital microprocessor circuit with associated memory and buffer configurations capable of executing the software as well as receiving and transmitting the appropriate data from and to other components. Such circuitry is well known in the art. In one embodiment, the microprocessor required to execute the program may be a dedicated microprocessor. However, because the global motion estimation computation is relatively simple and occurs only once per video frame, the program may be executed by a shared microprocessor, including, for example, one used for timing and control of the overall coder circuit.

Essentially, the global motion estimator generates a global motion vector for a video frame by estimating the component of motion common to every block in the entire frame. This motion component is typically caused by camera motion or panning. The global motion estimator according to the present invention uses the block motion vectors associated with the previous frame to calculate the present global motion component.

A global motion estimator embodiment that executes the steps illustrated in FIG. 4 operates by first defining a common motion vector by taking the average of the motion vectors stored during the coding of a previous frame. A new global motion vector may then be provided to a motion estimator programmed to operate as discussed above in reference to FIG. 3A. Other methods for estimating the global motion may be readily employed by one of ordinary skill in the art.

In step 401, motion vector data defining a motion vector, $MV_{i,dt}$ for a block i, between a frame and a reference frame dt frames apart, is received from a block-based motion estimator. The motion estimator may suitably operate in accordance with FIG. 3A above to effect block matching and motion vector generation. In step 401, the received motion vector is also normalized so that it represents the motion between consecutive frames. A normalized motion vector is given by equation $MV_{i,dt}/dt$ where dt is the current frame number minus the reference frame number. In step 402, the motion vector, $MV_{i,dt}$, is added to a motion vector total, MVT, for the frame. Alternatively, the motion vector, $MV_{i,dt}$, may be stored in a memory in order to facilitate alternative global motion vector computation methods, as discussed further below. In step 403, a counter C is advanced to track the number of motion vectors received for the current frame.

In step 404, the global motion estimator may return to receive another motion vector for the current block i. If the coder circuit employs motion compensation interpolation, multiple motion vectors, typically two, are generated during the processing of each new block of video data. Control circuitry typically provides this information to the global motion estimator so that the appropriate decision in step 404 can be made. If there are no more motion vectors for the block i, step 405 is executed.

In step 405, the global motion estimator determines whether there is another block of the current video frame to be motion compensated, in other words, whether another motion vector is expected for the frame $F_t$. If another motion vector is expected for the current frame, the program returns to step 401 and waits for the next motion vector, $MV_{i,dt}$ at from the motion estimation device. If, however, another motion vector is not expected for the frame, the global motion estimator executes step 406.

In step 406 the common motion vector is calculated for the current frame. The common motion vector may be the average motion vector determined by dividing the motion vector total by the number of vectors, C, received for the frame, or in other words, MVT/C. Alternatively, the common motion vector may suitably be the median motion vector or some other value as discussed below.

In step 407, the global motion vector GMV is generated for use in motion estimating the next frame, which for motion compensation prediction would be the frame $F_{t+1}$. Because the motion vectors are normalized as they are received, the resulting global motion vector will also already be normalized. As discussed above, the global motion vector may then be scaled in the motion estimator to allow for block matching therein with respect to any reference frame. The global motion vector GMV may suitably be the common motion vector calculated in step 406. It should be noted, however, that the use of multiple common motion vectors to generate a global motion vector may allow more sophisticated methods of estimating the global motion.

In step 408, the global motion vector is provided to a connection to the motion estimator which is operable to perform block-based motion compensation. The motion estimator 104 may suitably perform the method discussed above in connection with FIG. 3A.

In the functional block 409, the counter C and motion vector total MVT of the global motion estimator are re-initialized to prepare for the global motion vector calculation for the next video frame.

In an alternative embodiment of the global motion estimation method, the median motion vector from a plurality of stored motion vectors may provide the common motion vector in step 406. In such an embodiment, step 402 of FIG. 4 would include the operation of storing the motion vector $MV_{i,dt}$. Step 406 would then include the step of analyzing the several stored motion vectors to determine the median. The foregoing steps may be readily implemented.

In yet another alternative embodiment, the global motion vector may suitably be determined from a histogram. Under this method, the motion vector occurring with the most repetition within the processing of a frame would constitute the global motion vector.

To implement this embodiment, step 402 would include the step of updating a histogram of a table of possible motion vector values. For example, if $MV_{i,dt}=(0,+3)$, the occurrence index for (0,+3) within the table of possible motion vector values is incremented by one. The population of possible motion vectors may suitably be created for each new frame, whereby the value of motion vector $MV_{i,dt}$ is added to the population unless it is already represented. For example, if $MV_{i,dt}=(0,+3)$, and no occurrence index for that value exists, then (0,+3) is added and its index is incremented to one.

Additionally, step 405 would include the step of scanning the table for the largest occurrence index. The motion vector value occurring the most is then determined to be the common motion vector. The programming necessarily to achieve the foregoing may be readily accomplished.

The usefulness of this embodiment is clear. It may assumed that most objects (and blocks) within a video frame do not exhibit independent movement. For example, background objects in most scenes are relatively static. However, if camera motion or global motion is present, these otherwise static objects will all have the same motion vector. Because independently moving objects having the exact same motion vector will seldom outnumber the static objects, the motion vector having the most occurrences within a video frame is assumed to represent the global motion.

It is to be understood that the above-described arrangements of the invention are merely illustrative. Other arrangements may be devised by those skilled in the art which will embody the principles of the invention and fall within the spirit and scope thereof.

I claim:

1. A method of converting a block of video data which is one of a plurality of blocks defining a frame of video data, into a compressed encoded digital bit stream for transmission over a transmission medium, said method comprising:

a) generating a global motion vector;

b) generating both video data and position data corresponding to the block of video data to be coded; and c) effecting block matching by using predetermined criteria to identify a displaced block corresponding to the block of video data to be coded, the displaced block having a location within a reference frame, said block matching step further comprising defining a search window within the reference frame using the global motion vector.

2. The method of claim 1 further comprising the steps:

d) generating a motion vector defined by the block position data and the location of the displaced block within the reference frame;

e) storing said motion vector;

f) encoding said motion vector into a bit stream for transmission; and g) repeating steps b) through f) for a plurality of blocks to be encoded, said plurality of blocks constituting at least a portion of one frame of video data.

3. The method of claim 2 wherein the step of generating the global motion vector further comprises the step of utilizing a plurality of the previously stored motion vectors from said step (e) to generate the global motion vector and further comprising the step of:

h) repeating steps a) through g) for a plurality of frames of video data.

4. The method of claim 3 wherein the plurality of previously stored motion vectors comprise motion vectors stored during the encoding of a frame of video data.

5. The method of claim 3 wherein the step of generating the global motion vector utilizing a plurality of the previously stored motion vectors further comprises utilizing the mean of the plurality of the previously stored motion vectors to generate the global motion vector.

6. The method of claim 3 wherein the step of generating the global motion vector utilizing a plurality of the previously stored motion vectors further comprises utilizing the median of the plurality of the previously stored motion vectors to generate the global motion vector.

7. The method of claim 3 wherein the step of generating the global motion vector utilizing a plurality of the previously stored motion vectors further comprises utilizing the motion vector occurring with the most repetition within the plurality of the previously stored motion vectors to generate the global motion vector.

8. An apparatus for determining the location of a displaced block of video data within a reference frame corresponding to a block of video data where the displaced block is identified from a plurality of candidate displaced blocks using predetermined criteria, the apparatus comprising:

a) a motion estimator comprising a processing means and memory means, the processing means operable to determine the location of a displaced block by defining a search window within the reference frame using a global motion vector, identifying a plurality of candidate displaced blocks having a location with the search window, and comparing each candidate displaced blocks with the block of video data; and b) a global motion estimator coupled to the motion estimator, comprising processing means and storage means, said processing means operable to generate global motion vectors.

9. The apparatus of claim 8 wherein the motion estimator further comprises means for effecting motion compensation prediction.

10. The apparatus of claim 8 wherein the motion estimator further comprises means for effecting motion compensation interpolation.

11. A video coder circuit for converting a plurality of frames of video data comprising a plurality of pels, each pel having pel video data, a plurality of pels further defining a block, into a compressed encoded digital bit stream for transmission over a transmission medium, said video coder circuit comprising:

a) a video frame storage unit operable to generate a block of video to be coded from a frame of video data, said block having a position within the frame of video data;

b) a motion estimation means connected to the video frame storage unit for receiving the video data corresponding to a block of video to be coded, said motion estimation means operable to effect block matching between a block of video to be coded and a block within a reference frame to identify a displaced block having a location within the reference frame, and to generate a motion vector defined by the position of the block to be coded and the location of the displaced block within the reference frame, said motion estimation means further operable to effect block matching using a global motion vector;

c) a first buffer for storing video data corresponding to one or more reference frames connected to the motion estimation means for providing reference frame video data thereto;

d) a second buffer for storing video data corresponding to a current frame connected to the first buffer for providing current frame video data thereto and connected to the motion estimation means;

e) a subtraction node connected to the video frame storage unit for receiving block video data and connected to the motion estimation means for receiving displaced block video data, said subtraction node operable to generate an error signal representative of the difference in pel video data between two blocks of video data; and f) a coding device connected to the subtraction node for receiving an error signal and connected to the motion estimation means for receiving a motion vector, said coding device operable to encode video data from a block error signal and motion vector data into a bit stream.

12. The video coder circuit of claim 11 wherein the motion estimation means further comprises means for effecting motion compensation prediction.

13. The video coder circuit of claim 11 wherein the motion estimation means further comprises means for effecting motion compensation interpolation.

14. The system of claim 11 further comprising a global motion estimation means connected to the motion estimation means for providing the global motion vector thereto, said global motion estimation means operable to generate global motion vector data representative of the global motion between video frames.

15. The system of claim 14 wherein the global motion estimation means is operably connected to receive motion vectors from the motion estimation means and is further operable to generate a global motion vector from a plurality of received motion vectors.

16. A method of defining a search window within a stored reference video frame for use in block matching in a block-based motion estimation device, the block-based motion estimation device being operable to effect block matching and generate motion vectors representing the displacement between a new video data block and a displaced block within the reference video frame, the search window definition method comprising:

a) generating a motion vector for the new data block from a frame of video data comprising a plurality of data blocks;

b) storing said motion vector in a memory;

c) repeating steps a) and b) until a plurality of motion vectors for a plurality of said data blocks within said frame of video data have been generated and stored;

d) generating a global motion vector from the plurality of the stored motion vectors;

e) identifying a video data block having a location within a frame of video data to be coded; and f) defining a search window having a location within a stored reference video frame wherein the location of the search window is at least partially dependent upon the global motion vector.

17. The method of claim 16 wherein the location of the search window to be defined in step f) is at least partially dependent on the location of the video data block within the frame of video data to be coded.

18. The method of claim 16 wherein the step of generating the global motion vector using a predetermined method further comprises the step of calculating the mean of the plurality of stored motion vectors.

19. The method of claim 16 wherein the step of generating the global motion vector using a predetermined method further comprises the step of determining the median of the plurality of stored motion vectors.

20. The method of claim 16 wherein the step of generating the global motion vector using a predetermined method further comprises the step of determining the motion vector occurring with the most repetition within the plurality of stored motion vectors.

21. The method of claim 20 wherein the step of generating the global motion further comprises the step of creating a table of occurrence indices for a plurality of possible motion vectors and the step of storing the motion vector comprises incrementing an occurrence index corresponding to the motion vector in the table.

\* \* \* \* \*